(12) United States Patent
Nakano et al.

(10) Patent No.: US 6,953,941 B2
(45) Date of Patent: Oct. 11, 2005

(54) RADIATION IMAGE CONVERSION PANEL AND PRODUCING METHOD THEREOF

(75) Inventors: Kuniaki Nakano, Uenohara-machi (JP); Satoshi Honda, Hachioji (JP); Osamu Morikawa, Hachioji (JP)

(73) Assignee: Konica Corporation (JP)

( * ) Notice: Subject to any disclaimer, the term of this patent is extended or adjusted under 35 U.S.C. 154(b) by 230 days.

(21) Appl. No.: 10/369,246

(22) Filed: Feb. 19, 2003

(65) Prior Publication Data

US 2003/0160187 A1 Aug. 28, 2003

(30) Foreign Application Priority Data

Feb. 25, 2002 (JP) ......................................... 2002-047730

(51) Int. Cl.⁷ ............................................. G03B 42/08
(52) U.S. Cl. ................................... 250/484.4; 250/589
(58) Field of Search .............................. 250/589, 590, 250/484.4

(56) References Cited

U.S. PATENT DOCUMENTS

| | | | |
|---|---|---|---|
| 3,859,527 A | | 1/1975 | Luckey |
| 4,835,397 A | * | 5/1989 | Arakawa et al. ......... 250/484.4 |
| 5,028,509 A | * | 7/1991 | Shimada et al. ............ 430/139 |
| 6,740,897 B2 | * | 5/2004 | Hosoi .......................... 250/584 |

FOREIGN PATENT DOCUMENTS

| JP | 48-80487 | 10/1973 |
|---|---|---|
| JP | 48-80489 | 10/1973 |
| JP | 51-29889 | 3/1976 |
| JP | 52-30487 | 3/1977 |
| JP | 53-39277 | 4/1978 |
| JP | 54-47883 A | 4/1979 |
| JP | 55-12142 A | 1/1980 |
| JP | 55-12143 A | 1/1980 |
| JP | 55-12144 A | 1/1980 |
| JP | 55-12145 A | 1/1980 |
| JP | 55-84389 A | 6/1980 |
| JP | 55-160078 A | 12/1980 |
| JP | 59-22046 A | 2/1984 |
| JP | 59-38278 A | 3/1984 |
| JP | 59-155487 A | 9/1984 |
| JP | 61-72087 A | 4/1986 |
| JP | 61-142497 A | 6/1986 |
| JP | 61-142500 A | 6/1986 |
| JP | 61-228400 A | 10/1986 |
| JP | 62-39737 A | 2/1987 |
| JP | 61-110200 A | 5/1987 |
| JP | 62-157600 A | 7/1987 |
| JP | 7-74334 | 3/1995 |
| JP | 2899812 B2 | 3/1999 |

* cited by examiner

Primary Examiner—Constantine Hannaher
(74) Attorney, Agent, or Firm—Cantor Colburn LLP (57) ABSTRACT

The invention relates to a radiation image conversion panel comprising a substrate having thereon a stimulable phosphor layer and a protective layer. The stimulable phosphor layer is provided on the substrate by a vapor-phase deposition method. Further, a construction including the substrate and the protective layer has a flexibility.

22 Claims, 2 Drawing Sheets

RADIATION IMAGE CONVERSION PANEL AND PRODUCING METHOD THEREOF

TECHNICAL FIELD

The invention relates to a radiation image conversion panel and a method for producing the radiation image conversion panel.

BACKGROUND

Recently, a method for converting a radiation image to a visible image utilizing a stimulable phosphor has been put in practical use.

In such the method, the radiation image conversion panel comprising a stimulable phosphor layer formed on a substrate such as that described in U.S. Pat. No. 3,859,527 and Japanese Patent Application Publication No., hereinafter referred to as JP-A 55-12144 is used. The stimulable phosphor layer of the radiation image conversion panel is exposed to radiation passed through an object so as to form a latent image or an accumulated image by accumulation of radiation energy corresponding to the radiation permeability of each portions of the object. And then the stimulable phosphor layer is scanned by a stimulating ray using a laser light beam so as to convert and emit the accumulated energy as light (stimulated light) and the intensity of the stimulated light emission is lead to obtain an image. Thus obtained image may be reproduced on various displays such as a CRT or printed out as a hard copy.

High radiation absorbability and light conversion efficiency, excellent graininess and high sharpness are required to the stimulable phosphor layer of the radiation image conversion panel.

Usually, the thickness of the stimulable phosphor layer should be made thicker for raising the sensitivity for radiation. However, there is certain limitation since the light cannot be output by the scatter of the stimulated light between the stimulable phosphor particles.

When the layer thickness is too thin, deterioration on the sensitivity is caused even though the sharpness is raised accompanied with reducing of the layer thickness.

The graininess is depended on the local flicker of quantum number of the radiation or the quantum mottle, and the irregularity of the structure of the stimulable phosphor layer or the structure mottle in the radiation image conversion panel. Accordingly, the reducing of the thickness of the stimulable phosphor layer causes degradation of image quality since the quantum number of the radiation is reduced by the absorption by the stimulable phosphor layer so as to increase the mottle, or the structural irregularity is actualized and the structural mottle is increased. Therefore, a thick stimulable phosphor layer is usually necessary for improving the graininess.

The image quality and the sensitivity of the radiation image conversion method depend on various factors as mentioned above. Until now, various investigations have been carried out for improving the sensitivity and the image quality by controlling the plural factors relating to the sensitivity and the image quality.

Among these methods, it has been tried as the means for improving the sharpness of the radiation image that the shape of the stimulable phosphor is controlled to improve the sensitivity and the sharpness.

A trial of such the methods, for example, JP-A 61-142497 disclose a method in which a stimulable phosphor layer constituted by a pseudo-columnar block which is formed by a sedimentation of the stimulable phosphor on a substrate having a surface with rough pattern.

JP-A 61-142500 describes a method using a radiation image conversion panel having a stimulable phosphor layer in which a crack between the columnar blocks formed by the sedimentation of the stimulable phosphor on the substrate having a fine pattern was subjected to a shock treatment to grow the crack. Furthermore, JP-A 62-39737 describes a method using a radiation image conversion panel in which a crack is formed from the surface side of a stimulable phosphor layer formed on a substrate to make a columnar shape. Moreover, JP-A 62-110200 proposes a method in which a stimulable phosphor layer having a void is formed on the substance by vapor deposition and subjected to a heating treatment to form a crack by growing the void.

Recently, JP-A 62-157600 discloses a method in which when a stimulable phosphor layer is formed on a substrate by vapor-phase deposition method, the crossing angle of a stream line of the vapor of the stimulable phosphor to the substrate surface is controlled within a specified range to form the stimulable phosphor layer having a prescribed thickness; and Japanese Patent No. 2899812 proposes a radiation image conversion panel having a stimulable phosphor layer in which a slender columnar crystallite is formed so that the crystallite makes a certain angle with the normal line direction of the substrate.

In these trials for controlling the shape of phosphor layer, it is object to improve the image quality by making the phosphor layer to the columnar structure. The sharpness of the image of stimulated light emission can be considerably increased by making the columnar structure since the diffusion of the stimulating rays or the stimulated light emission in the horizontal direction since the light reaches to the substrate surface by repeating reflection at the cracks (interface of the columnar crystallites.) In the radiation image conversion panels prepared by the vapor phase deposition method as above-mentioned, a glass plate or a ceramic plate is usually used for providing the heat resistively on the occasion of the vapor-phase deposition, and glass is used as the protective layer for holding the moisture proof ability.

However, the usual radiation image conversion panel in which both of the substrate and the protective layer are constituted by the glass plate or the ceramic plate, each of which does not have a flexibility, has a problem such as that the panel is high in the cost and easily breakable and is as heavy as difficultly handling even though the moisture resistance is excellent. Moreover, further improvement on the image quality is required also to the radiation image conversion panel having the stimulable phosphor layer formed by vapor-phase deposition.

SUMMARY

The aspect of the invention is to provide a radiation image conversion panel and a producing method thereof, which has a high strength and operation suitability and gives a high image quality.

The foregoing aspect can be attained by the following structures.

Structure 1

A radiation image conversion panel comprising a substrate having thereon a stimulable phosphor layer and a protective layer. The stimulable phosphor layer is provided on the substrate by a vapor-phase deposition method. Further, a construction including the substrate and the protective layer has a flexibility.

Structure 2

The radiation image conversion panel of above-described Structure 1, wherein each of the substrate and the protective layer has an organic material plate or a glass plate having a thickness of not more than 1000 μm.

Structure 3

The radiation image conversion panel of above-described Structure 1, wherein the stimulable phosphor layer comprises a stimulable phosphor having a composition represented by following General Formula (1), $$M^I X \cdot a M^{II} X'_2 \cdot b M^{III} X''_3 \cdot eA \qquad \text{General Formula (1)}$$

wherein $M^I$ is an alkaline metal selected form the group consisting of Li, Na, K, Rb and Cs; $M^{II}$ is a divalent metal selected from the group consisting of Be, Mg, Ca, Sr, Ba, Zn Cd and Ni; $M^{III}$ is a trivalent metal selected from the group consisting of Sc, Y, La, Ce, Pr, Nd, Pm, Sm Eu, Gd, Tb, Dy, Ho, Er, Tm Yb, Lu, Al, Ga and In; each of X, X' and X'' is a halogen selected from the group consisting of F, Cl, Br and I; A is a metal selected from the group consisting of Eu, Tb, In, Ga, Ce, Tm, Dy, Pr, Ho, Nd, Yb, Er, Gd, Bu, Sm, Y, Tl, Na, Ag, Cu and Mg; and each of a, b, and e is a numeral within a range of $0 \leq a \leq 0.5$, $0 \leq b < 0.5$, and $0 < e \leq 0.2$, respectively.

Structure 4

The radiation image conversion panel of above-described Structure 3, wherein, in General Formula (1), $M^I$ is an alkaline metal selected from the group consisting of K, Rb and Cs.

Structure 5

The radiation image conversion panel of above-described Structure 3, wherein, in General Formula (1), X is Br or I.

Structure 6

The radiation image conversion panel of above-described Structure 3, wherein, in General Formula (1), $M^{II}$ is a divalent metal selected from the group consisting of Be, Mg, Ca, Sr and Ba.

Structure 7

The radiation image conversion panel of above-described Structure 3, wherein, in General Formula (1), $M^{III}$ is a trivalent metal selected from the group consisting of Y, La, Ce, Sm, Eu, Gd, Lu, Al, Ga and In.

Structure 8

The radiation image conversion panel of above-described Structure 3, wherein, in General Formula (1), b is a numeral within a range of $0 \leq b \leq 10^{-2}$.

Structure 9

The radiation image conversion panel of above-described Structure 3, wherein, in General Formula (1), A is a metal selected from the group consisting of Eu, Ce, Sm, Tl and Na.

Structure 10

The radiation image conversion panel of above-described Structure 3, wherein the stimulable phosphor having the composition represented by General Formula (1) is represented by following General Formula (2), $$CsX:yA \qquad \text{General Formula (2)}$$

wherein X represents Cl, Br, or I; A represents Eu, Sm, In, Tl, Ga or Ce; and y is a numeral within a range of from $1 \times 10^{-7}$ to $1 \times 10^{-2}$.

Structure 11

A method for producing a radiation image conversion panel, comprising the steps of:

forming a stimulable phosphor layer on a substrate by a vapor-phase deposition method, and sealing the stimulable phosphor layer by superposing a protective layer on the stimulable phosphor layer, wherein a construction including the substrate and the protective layer has a flexibility.

Structure 12

The method of above-described Structure 11, wherein, during the forming step, a stimulable phosphor or a raw material of the stimulable phosphor is poured on the substrate in an incident angle of 0 degree to 80 degrees with a normal line of a surface of the substrate.

Structure 13

The method of above-described Structure 12, wherein the stimulable phosphor or the raw material of the stimulable phosphor is poured in the incident angle of 0 degree to 70 degrees.

Structure 14

The method of above-described structure 12, wherein the stimulable phosphor or the raw material of the stimulable phosphor is poured in the incident angle of 20 degrees to 80 degrees, and thereby, the stimulable phosphor layer constituted by independent columnar crystals is formed on the substrate in a growing angle of 10 degrees to 70 degrees with the normal line of the surface of the substrate.

Structure 15

The method of above-described Structure 15, wherein the stimulable phosphor or the raw material of the stimulable phosphor is poured in the incident angle of 40 degrees to 70 degrees, and thereby, the stimulable phosphor layer is formed on the substrate in a growing angle of 10 degrees to 70 degrees.

DETAILED DESCRIPTION OF THE INVENTION

The invention is described in detail below.

As a result of various investigations about the forgoing problems, it has been found by the inventors that the radiation image conversion panel having a high strength and moisture proof ability and giving an image with high quality can be provided by a radiation image conversion panel having a stimulable phosphor layer and a protective layer on a substrate, wherein the stimulable phosphor layer is produced by a vapor-phase deposition method, and the construction including the substrate and the protective layer has flexibility.

It is essential that the construction including the substrate and the protective layer have the flexibility for raising the strength and obtaining the high image quality with keeping the moisture resistance.

In the invention, "a construction including a substrate and a protective layer have a flexibility" is defined as follows.

Preparation of Samples for Flexibility Test (Preparation of the Constructions Including the Substrate and the Protective Layer)

Now, the definition of the flexibility in the present invention is explained with reference to FIGS. 4(a) and 4(b).

Each of the substrate and the protective layer for the radiation image conversion panel is cut into a 40-cm-square. The cut substrate 30 and protective layer 31 are adhered to each other with utilizing an adhesive agent. Thus, the sample 32 is prepared.

Flexibility Test

Figure 4A:
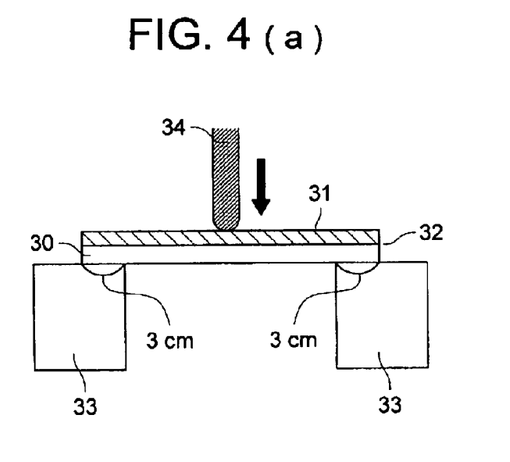
FIG. 4(a) shows a method for measuring the flexibility of the construction including the substrate and the protective layer according to the invention.
Figure 4B:
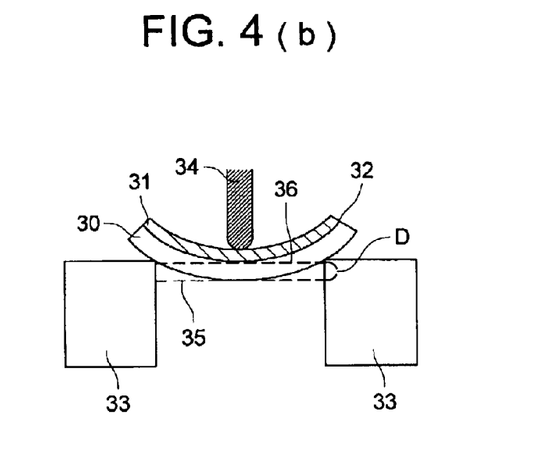
FIG. 4(b) shows a method for measuring the flexibility of the construction including the substrate and the protective layer according to the present invention.

As shown in FIG. 4(a), the under surfaces of parts having each a width of 3 cm from facing edges of the sample 32 are supported by supporting member 33, respectively. A linear portion at an intermediate position between the facing edges of the sample 32 is pressed, progressively, by a pressing member 34. The portion of the pressing member, which contacts the sample, has a hummel shape. Continuously, the sample 32 is pressed by the pressing member 34 until at least one of the substrate and the protective layer is broken. As shown in FIG. 4(b), the distance D between the bottom of the sample right before broken and the plane formed by connecting tops of the supporting member is measured.

In the present invention, "a construction including a substrate and a protective layer has a flexibility" means that the distance D obtained in accordance with the above-described test is not less than 5 mm. In the present invention, it is preferable that the distance D is not less than 10 mm, and more preferable is not less than 20 mm.

Operation easiness and durability of the radiation image conversion panel are considerably raised by providing the flexibility.

Substrate

The substrate relating to the invention is described below.

Various kinds of polymer material, glass, ceramics and metal are usable as the substrate relating to the invention, as long as the construction including the substrate and the protective layer has the flexibility. Examples of the material of the substrate include a glass plate such as quartz, boron silicate glass, chemically tempered glass and crystallized glass; ceramics such as alumina and silicon nitride; plastic film such as cellulose acetate film, polyester film, polyethylene terephthalate film, polyethersulfone film, poly (sulfonic acid) film, polyallyrate film, poly(ether ether ketone) film, polyamide film, polyimide film, cellulose triacetate film, and polycarbonate film; a sheet of metal such as aluminum, iron, copper and chromium; and a metal sheet having a covering layer of a hydrophilic fine particle. The surface of the substrate may be either smooth or matted for improving the adhesiveness with the stimulable phosphor layer. The flexibility of the construction including the substrate and the protective layer according to the invention should be obtained by using the later-mentioned material to be used for the protective layer. An adhesive layer may be provided on the surface of the substrate when it is necessary.

Thickness of the Substrate

The thickness of the substrate is preferably from 10 $\mu$m to 1,000 $\mu$m, more preferably from 50 $\mu$m to 500 $\mu$m for giving the forgoing flexibility to the construction including substrate and the protective layer according to the invention.

Protective Layer (Protective Film)

The protective layer relating to the invention is described below.

For the protective layer relating to the invention, any material having high light transmittance and capable of being formed a sheet can be used, as long as the construction including the substrate and the protective layer. For example, glass plate such as quartz, boron-silicate glass and chemically tempered glass; and organic polymer such as PET, OPP and poly(vinyl chloride) are usable.

The protective layer may be either a single or plural layers which may be constituted by two or more layers different from each other in the material thereof. For example, a film composed of two or more laminated layers is usable. Such the laminated film may be produced by, for example, a dry lamination method, an extrusion lamination method and a co-extrusion lamination method. The combination of the two or more layers in the protective layer is not limited to that of organic polymers, and a combination of two kinds of glass or a combination of a glass plate and an organic polymer layer may also be used. The combination of the glass plate and the organic polymer layer may be formed by, for example, a method in which a protective layer coating liquid is directly coated on the glass plate or a method in which a previously prepared polymer protective layer is adhered on the glass plate. The two or more layers may be contacted or separated.

The thickness of the protective layer is preferably from 5 $\mu$m to 1,000 $\mu$m, more preferably from 10 $\mu$m to 500 $\mu$m for giving the forgoing flexibility to the construction including the substrate and the protective layer according to the invention.

The glass prate is particularly preferred as the material of the protective layer since it is excellent in the moisture proof ability.

One having high transmittance within wide wavelength range for transmitting the stimulating rays and the stimulated light emission with high efficiency is preferred as the protective layer according to the invention. The transmittance is preferably not less than 80%. For example, quartz glass and boron-silicate glass are preferable as the material having such the high transmittance.

The boric-silicic acid glass has transmittance of not less than 80% to the light having a wavelength within the range of from 330 nm to 2.6 $\mu$m and the quartz glass also has high transmittance in shorter wavelength region.

A reflection preventing layer such as a layer of $MgF_2$ is preferably provided, which shows an effect to raise the transmitting efficiency of the stimulating ray and the stimulated light, and to prevent the degradation of sharpness. The refractive index of the protective layer is not specifically limited. The refractive indexes of preferable materials are from 1.4 to 2.0.

Stimulable Phosphor Layer

The stimulable phosphor layer is described below.

As the stimulable phosphor used in the stimulable phosphor layer in the invention, alkali halide type stimulable phosphor represented by the foregoing Formula 1 or Formula 2 are preferably used. The stimulable phosphors having the composition represented by Formula 2 is particularly preferably used.

Among them, the stimulable phosphor having the composition of CsX:Eu, in which X is a halogen atom, has high X-ray absorbability. Accordingly, high sensitivity can be attained by the use of such the stimulable phosphor, and both of high sensitivity and high sharpness can be compatibly attained by forming the columnar shaped crystallite under a precisely controlled condition.

For producing the foregoing stimulable phosphors, materials described in Japanese Examined Patent Application Publication Nos. 7-84589, 7-74334, 7-84591 and 5-01475 are usable.

The stimulable phosphor layer preferably has the columnar crystal structure; and it is more preferable that the columnar crystallites are independent from each other and have a crystal structure grown holding a certain space between each of them. As the method for growing the crystallites so that the crystallites have each the columnar crystal structure and are independently grown holding the certain space between the crystallites, for example the method described in Japanese Patent No. 2899812 can be preferably applied.

Preparation of stimulable phosphor layer by vapor-phase deposition method

For growing the columnar crystallite by the vapor-phase deposition method, an vapor evaporation method, a spattering method and a CVD method are preferably applicable.

The stimulable phosphor layer having the independent long columnar crystal structure can be obtained by a method in which the vapor of the stimulable phosphor or a raw material thereof is supplied onto the substrate at a specified incident angle to grow the crystallite; such the method is referred to as the vapor-phase deposition method. By this method, the columnar crystallite can be grown at a growing angle which is about half of the incident angle of the vapor of the stimulable phosphor on occasion of the deposition.

For supplying the vapor of the stimulable phosphor or the raw material thereof onto the substrate at the prescribed angle, the following methods-are applicable: a method in which the substrate is set so as to take the angle with respect to a crucible in which the vapor source is charged, or a method in which the substrate and the crucible are set in parallel and the vapor stream is regulated by a slit so that the slantwise component from the vaporizing surface is selectively deposited on the substrate.

In these cases, the shortest distance between the substrate and the crucible is preferably set at approximately from 10 cm to 60 cm so as to match the average flying range of the stimulable phosphor.

The thickness of the columnar crystallite is influenced by the temperature of the substrate, the vacuum degree and the incident angle of the vapor. Accordingly, the columnar crystallite having required thickness can be prepared by controlling these factors. The columnar crystallite is made slender accompanied with lowering of the temperature of the substrate. The columnar state of the crystalline is difficultly maintained when the substrate temperature is too low. The substrate temperature is preferably from 100° C. to 300° C., more preferably from 150° C. to 270° C. Regarding the incident angle of the vapor stream, the crystalline is made slenderer when the incident angle is made larger in the case of the incident angle is more than 0°. The incident angle is preferably from 20° to 80°, more preferably from 30° to 70°. Regarding the vacuum degree, the crystalline is made slenderer when the vacuum degree is made higher in the case of that the incident angle of the vapor stream is more than 0°. The preferable vacuum degree is not more than 0.013 Pa. When the incident angle is 0° C., the crystallite is made slenderer accompanied with lowering of the vacuum degree in the low vacuum region. The preferable vacuum degree is not less than 0.13 Pa.

For improving the modulation transfer function MFT of the stimulable phosphor layer comprising the columnar crystallites, the size of the columnar crystallite is preferably from 1 $\mu$m to 50 $\mu$m, more preferably from 1 $\mu$m to 30 $\mu$m. In the above, the size of the crystallite is an average value of the diameter of a circle having the area corresponding to that of the cross section of the columnar crystallite observed from the face parallel with the substrate surface; the average value is calculated based on an electronmicroscopic photograph including at least 100 crystallites in the view field thereof. When the columnar crystallite is slenderer than 1 $\mu$m, the MTF is lowered since the stimulated light is scattered by the columnar crystallite. When the columnar crystallite is 50 $\mu$m or more, the MFT is also lowered since the directivity of the stimulated light is lowered.

The space between each of the columnar crystallites is preferably not more than 30 $\mu$m, more preferably not more than 5 $\mu$m. When the space exceeds 30 $\mu$m, the sensitivity is lowered since the filling factor of the phosphor in the phosphor layer.

The growing angle of the slant columnar crystallite of the stimulable phosphor is not limited. However, the angle is preferably from 10° to 70°, more preferably from 20° to 55°. The incident angle is set at an angle of from 20° to 80° to make the growing angle to from 10° to 70°, and the incident angle is set at an angle of from 40° to 70° to make the growing angle to from 20° to 55°. When the growing angle is too large, the layer is made fragile since the crystalline is excessively slanted.

Vapor Evaporation Method

In the vapor evaporation method, the substrate is set in a vapor evaporation apparatus; and the pressure in the interior of the apparatus is reduced until approximately $1.333 \times 10^{-4}$ Pa by suction; and then at least one kind of the stimulable phosphor was heated and evaporated by a method such as a resistive heating method and an electron beam method so that the stimulable phosphor is sidlingly deposited until the required thickness. Thus, a stimulable phosphor layer containing no binder is formed. In the foregoing vapor evaporation method, the stimulable phosphor layer may be separated into plural steps. In the foregoing vapor evaporation method, the vapor evaporation may be carried out by using plural resistive heaters or electron beams. Furthermore, it is possible in the vapor evaporation method that raw materials of the stimulable phosphor are vaporized and deposited using plural resistive heaters or electron beams so that the objective stimulable phosphor is synthesized on the substrate to form the stimulable phosphor layer. In the vapor evaporation method, the deposited substance may be cooled or heated on occasion of the deposition, according to necessity. The stimulable phosphor layer may be heated after the deposition.

Spatter Method

In the spatter method, the substrate is set in a spatter apparatus the same as in the vapor evaporation method. The interior of the apparatus is once exhausted until a vacuum degree of about $1.333 \times 10^{-4}$ Pa, and an inert gas such as Ar and Ne as the gas for spattering is introduced into the apparatus so as to make the gas pressure to $1.333 \times 10^{-1}$ Pa. And then the stimulable phosphor, as the target, is spattered so that the stimulable phosphor is sidlingly deposited until the desired thickness. The spattering process can be separated in plural times for forming the stimulable phosphor layer in a similar way to the vapor evaporation methods. It is also possible to form the stimulable phosphor layer by continuously or successively spattering the target by the respective method. In the spattering method, the objective stimulable phosphor layer can be formed on the substrate by continuously or successively spattering plural raw materials of the stimulable phosphor as the targets. A reacting spatter may be applied by introducing another gas such as $O_2$ and $H_2$. In the spatter method, the deposited substance may be cooled or heated on occasion of the spattering, according to necessity. The stimulable phosphor layer may be heated after the spattering.

CDV Method

In the CDV method, the stimulable phosphor layer containing no binder is obtained on the substrate by decomposing the stimulable phosphor or an organic metal compound containing the raw materials of the stimulable phosphor by energy such as heat and high frequency electric power. The stimulable phosphor can be grown as the independent slender columnar crystallite making the specified angle with the direction of the normal line of the substrate. Thickness of the stimulable phosphor layer The thickness of the stimulable phosphor layer is preferably within the range of from 10 μm to 1,000 μm, more preferably from 20 μm to 800 μm, even though the preferable thickness is varied according to the objective sensitivity and the kind of the stimulable phosphor of the radiation image conversion panel.

On occasion of the production of the stimulable phosphor layer using the foregoing vapor-phase deposition method, the stimulable phosphor as the vapor source is uniformly molten or shaped by pressing or hot-pressing and charged in the crucible. A degas treatment is preferably applied on the occasion. The stimulable phosphor is vaporized by scanning by an electron beam generated by an electron gun, but the vaporization can also be performed by another method.

The vapor source may not be always the stimulable phosphor only and it may be a mixture of the raw materials of the stimulable phosphor.

An activator of the stimulable phosphor may be deposited by the vaporization of a mixture with a basic substance, or the activator may be doped after the deposition of the basic substance. For example, RbBr as the basic substance is deposited by the vapor evaporation and the activator such as Tl may be doped. The doping can be sufficiently carried out even when the stimulable phosphor layer is thick since the crystallites are each independent and the MFT is not lowered because the crystallite is difficultly grown.

The doping can be performed by heat diffusion or ion injection the doping agent or the activator into the layer of the basic substance.

Figure 1:
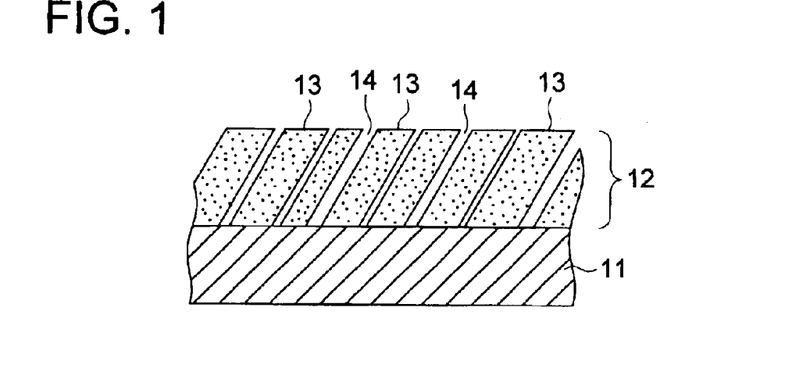
FIG. 1 shows a cross section of a stimulable phosphor layer formed on a substrate.
Figure 2:
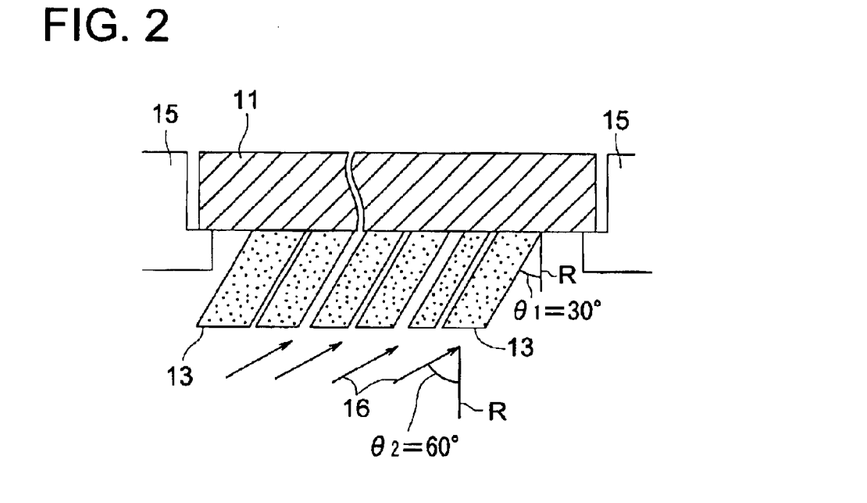
FIG. 2 shows the situation of formation of the stimulable phosphor layer by vapor sedimentation.

The formation of the stimulable phosphor layer according to the invention is described referring FIGS. 1 and 2.

FIG. 1 shows a schematic cross section of an example of the stimulable phosphor layer having the columnar crystallite formed on the substrate by the foregoing vapor-phase deposition method. In the drawing, 11 is the substrate, 12 is the stimulable phosphor layer and 13 is the columnar crystallite constituting the stimulable phosphor layer, and 14 is the space formed between the columnar crystallites.

FIG. 2 shows the situation of formation of the stimulable phosphor layer on the substrate by the vapor-phase deposition. When the incident angle of the vapor stream of the stimulable phosphor 16 made with the direction of the normal line R of the substrate surface is represented by $\theta_2$, the angle of the formed columnar crystallite made with the direction of the normal line of the substrate surface R is represented by $\theta_1$; the columnar crystallite is formed in the direction of the angle $\theta_1$. In FIG. 2, the incident angle $\theta_2$ is about 60° and $\theta_1$ is about 30°. It has been empirically know that the angle $\theta_1$ is approximately a half of the angle $\theta_2$.

The stimulable phosphor layer formed on the substrate by the foregoing method is excellent in the directivity since it contains no binder. Accordingly, the thickness of the layer can be made thicker than that of a radiation image conversion panel having a dispersion type stimulable phosphor layer comprising a binder and the stimulable phosphor dispersed in the binder because the directivity of the stimulating ray and the stimulated light are high in the stimulable phosphor layer according to the invention. Furthermore, the sharpness of the image can be improved since the scattering of the stimulating ray in the stimulable phosphor layer is reduced.

A filling material such as a binder may be filled in the space between the columnar crystallites; the stimulable phosphor layer is strengthened by the filling. A substance having high light absorbency or a substance having high reflectance may be filled. The diffusion in the horizontal direction of the exciting light fallen in the stimulable phosphor layer is almost completely prevented by the filling by such the substance.

The substance having high light absorbance is a substance highly reflecting the stimulating ray (having a wavelength of from 500 to 900 nm, particularly from 600 to 800 nm). Examples of such the substance include a metal such as aluminum, magnesium, silver and indium; and a colorant such as a white pigment and a pigment having a color within the region of from green to red.

The white pigment can also reflect the stimulated light. Examples of the white pigment include anatase- and rutile-type $TiO_2$, $MgO$, $PbCO_3 \cdot Pb(OH)_2$, $BaSO_4$, $Al_2O_3$, $M(II)FX$ in which $M(II)$ is at least one of Ba, Sr and Ca in which X is at least one of Cl and Br, $CaCO_3$, $ZnO$, $Sb_2O_3$, $SiO_2$, $ZrO_2$, lithopone ($BaSO_4 \cdot ZnS$), magnesium silicate, basic lead silica-sulfate, basic lead phosphate and aluminum silicate. These pigments have high masking ability and reflectance. Accordingly, the white pigment easily scatters the stimulated light by reflection and refracting so as to raise the sensitivity of the radiation image conversion panel thus obtained.

As the substance having high absorbance, for example, carbon, chromium oxide, nickel oxide, iron oxide and a blue, colorant are usable. Among them, carbon also absorbs the stimulated light.

The colorant may be either an organic or inorganic colorant. Examples of the organic colorant include Zapon Fast Blue 3G produced by Hoechst Co., Ltd., Estrol Brill Blue N-3RL produced by Sumitomo Kagaku Co., Ltd., D & C Blue No. 1 produced by National Aniline Co., Ltd., Spirit Blue produced by Hodogaya Kagaku Co., Ltd., Oil Blue No. 603 produced by Orient CO., Ltd., Kiton Blue, Aizen Cathilon Blue GLH produced by Hodogaya Kagaku Co., Ltd., Lake Blue AFH produced by Kyowa Sangyou Co., Ltd., Primocyanine 6GX produced by Hodogaya Kagaku Co., Ltd., Brillacid Green 6BH produced by Hodogaya Kagaku Co., Ltd., Cyanine Blue BNRCS produced by Toyo Ink Mfg. Co., Ltd., and Lionol Blue SL produced by Toyo Ink Mfg. Co., Ltd. The organic metal complex colorant such as Color Index Nose, 24411, 23160, 74180, 74200, 22800, 23154, 23155, 24401, 14830, 15050, 15760, 15707, 17941, 74220, 13425, 13361, 13420, 11836, 74140, 74380, 74350 and 74460 are also usable. Examples of the inorganic colorant include ultramarine, cobalt blue, cerulean blue, chromium oxide, and a $TiO_2$—$ZnO$—$Co$—$NiO$ type pigment.

Examples of the stimulable phosphor usable in the image conversion panel according to the invention include phosphors represented by $BaSO_4$:A, which are described in JP-A 48-80487, phosphors represented by $SrSO_4$:Ax which are described in JP-A 48-80489, phosphors represented by $Na_2SO_4$, CaS or $BaSO_4$ each containing at least one of Dy and Dy which are described in JP-A 51-29889, phosphors represented by BeO, LiF, $MgSO_4$ or $CaF_2$ which are described in JP-A 52-30487, phosphors represented by $Li_2B_4O_7$:Cu or Ag which are described in JP-A 53-39277, phosphors represented by $Li_2O.(Be_2O_2)_x$:Cu,Ag which are described in JP-A 54-47883, phosphors represented by SrS:Ce,Sm, SrS:Eu,Sm, $La_2O_2S$:Eu,Sm and(Zn, Cd)S:$Mn_x$ which are described in U.S. Pat. No. 3,859,527 and phosphors represented by ZnS:Cu,Pb, barium aluminate phosphors represented by $BaO.xAl_2O_3$:Eu and alkaline earth metal silicate phosphors represented by $M(II).xSiO_2$:A which are described in JP-A 55-12142.

Examples of the phosphors further include the followings: alkaline earth fluorohalide phosphors represented by $(Ba_{1-x-y}Mg_xCa_y)F_x:EU^{2+}$ which are described in JP-A 55-12143, phosphors represented by LnOX:xA which are described in JP-A 55-12144, phosphors represented by $(Ba_{1-x}M(II)_x)F_x:yA$ which are described in JP-A 55-12145, phosphors represented by BaFX:xCe,yA which are described in JP-A 55-84389, phosphors of divalent metal fluorohalide activated by rare earth metal represented by M(II)FX.xA:yLn and phosphors represented by ZnS:A, CdS:A or (Zn, Cd)S:A ,X which are described in JP-A 55-160078, phosphors represented by one of the following formulas which are described in JP-A 59-38278:

$xM_3(PO_4)_s \cdot NX_2:yA$ and $xM_3(PO_4)_s:yA$, phosphors represented by one of the following formulas which are described in JP-A 59-155487:

$nRe_3 \cdot mAX'_2:xEu$ and $nRe_3 \cdot mAX'_2:xEu, ySm$, alkali halide phosphors represented by $M(I)X \cdot aM(II)X'_2:bM(III)X''_3:cA$ which are described in JP-A 61-72087 and phosphors of alkali halide activated by bismuth represented by M(I)X:xBi which are described in JP-A 61-228400.

The alkali halide phosphors are preferable since the columnar stimulable phosphor layer is easily formed by such the substance using the vapor evaporation or spattering method.

Among the alkali halide phosphors, CsBr type phosphors are preferable which give high luminance and high image quality.

Low Refractive Layer

In the invention, it is preferred to provide a low refractive layer between the protective layer and the stimulable phosphor. The low refractive layer is a layer comprising a substance having a refractive index smaller than that of the protective layer, and the degradation of the sharpness can be inhibited by the presence of such the layer even when the thickness of the protective layer is increased. For the low refractive layer, a substance such as $CaF_2$ having a refractive index of from 1.23 to 1.26, $Na_2AlF_6$ having a refractive index of 1.35, $MgF_2$ having a refractive index of 1.38 and $SiO_2$ having a refractive index of 1.48 is usable; the compound is preferably used in a form of a thin layer formed by the gas phase sedimentation. A layer of a liquid such as ethanol having a refractive index of 1.36, methanol having a refractive index of 1.33 and diethyl ether having a refractive index of 1.35 is also can be used.

The use of a layer of gas such as air, nitrogen and argon or vacuum having each a refractive index of substantially 1 as the low refractive layer is particularly preferable, since such the layer show high ability for preventing the sharpness degradation. The thickness of the low refractive layer is preferably from 0.05 μm to 3 mm. The low refractive layer may either be contacted with or separately positioned from the stimulable phosphor layer. One method for contacting the low refractive layer with the stimulable phosphor layer is that using an adhesive agent. In such the case, the refractive index of the adhesive agent is preferably near that of the stimulable phosphor layer or the low refractive layer.

Figure 3:
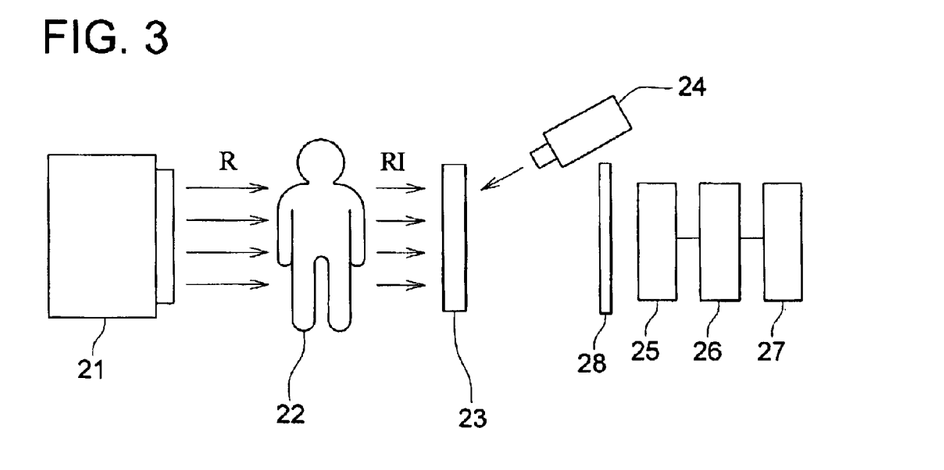
FIG. 3 shows an example of the constitution of the radiation image conversion panel according to the invention.

FIG. 3. is a schematic cross section showing an embodiment of the radiation image conversion panel according to the invention.

In FIG. 3, 21 is a radiation generating apparatus. 22 is an object, 23 is the radiation image conversion panel having a stimulable phosphor layer sensitive to visible light and infrared rays which contains a stimulable phosphor, 24 is a source of stimulating ray, 25 is an photo-electric conversion apparatus for detecting stimulated light emitted from the radiation image conversion panel 23, 26 is an apparatus by which the signals detected by the photo-electric conversion apparatus 25 is reproduced as an image, 27 is a displaying apparatus for displaying the reproduced image and 28 is a filter for cutting reflected light from the light source and passing only the light emitted from the radiation image conversion panel 24. FIG. 3 is an example for obtaining a radiation transmission image. When the radiation is generated from the object 12 itself, the radiation generation apparatus 21 is not necessary. The photo-electric conversion apparatus and the subsequent apparatus are not limited to the above-mentioned as far as the photo signals from the radiation image conversion panel 23 can be reproduced in any form of image.

As is shown in FIG. 3, the object 22 is positioned between the radiation generating apparatus 21 and the irradiation image conversion panel 23 and radiation R is irradiated. The radiation transmits through the object according to the variation of the radiation transmittance of the each portions of the object and the transmission image RI of the object, namely the image of the intensity of the radiation, is projected to the radiation-conversion panel 23. The projected transmission image RI is absorbed by the stimulable phosphor layer of the radiation image conversion panel 23 so as to generate electrons and/or positive holes in a number in proportion to the amount of the radiation absorbed in the stimulable phosphor layer and the electrons and/or positive hales are accumulated at the trap level of the stimulable phosphor. Thus a latent image is formed by the accumulation of energy of the radiation transmission image. Then the latent image is stimulated by light energy for actualizing the image. Namely, the stimulable phosphor layer is irradiated by the light source generating visible or infrared light so that the electrons and/or positive holes accumulated at the trap level are released by the irradiated light and the accumulated energy is emitted as stimulated light. The intensity of the emitted stimulated light is proportional to the number of the accumulated electron and/or positive hole, namely proportional to the intensity of the energy of the radiation absorbed by the stimulable phosphor layer. The emitted light signals are converted by the photo-electric conversion apparatus 25 such as a photomultiplier and reproduced as the image by the image treating apparatus 26. The reproduced image is displayed by the image displaying apparatus 27. As the image treatment apparatus 26, one is advantageously used which is capable of performing not only reproduction of image but also treatment of image, operation of image, remaining the memory of image and store the image.

The stimulated light emitted from the stimulable phosphor layer preferably has the spectral distribution at the wavelength region as short as possible because it is necessary that the stimulated light emitted from the stimulable phosphor layer is separated from the reflected light of the stimulating ray on occasion of stimulating the stimulable phosphor by the light energy and the sensitivity of the photo-electric conversion apparatus for receiving the light emitted from the stimulable phosphor layer is usually high to the energy of short wavelength light of not more than 600 nm. Both of the foregoing conditions are satisfied since the light emitting region of the stimulable phosphor layer according to the invention is from 300 to 500 nm and the wavelength region of the stimulating light is from 500 to 900 nm. Recently, a semiconductor laser is liked for the stimulating light source used for leading the image on the radiation image conversion panel accompanied with the progress of down sizing of the diagnosis apparatus, since the semiconductor laser generates high power light and suitable for a compact apparatus. The emitted light of the semiconductor laser is 680 nm; and the stimulable phosphor built in the radiation image conversion panel according to the invention shows a considerable high sharpness when the panel is excited by the light at the wavelength of 680 nm.

The stimulable phosphors each emits light having the main intensity peak within a wavelength region of not more than 500 nm. Accordingly, the stimulated light can be easily separated from the stimulating ray and is fully suitable for the spectral sensitivity of the light detector so as to accept the emitted light with high efficiency. As a result of that, the sensitivity of the image receiving system can be raised.

A light source generating light containing the wavelength capable of stimulating the stimulable phosphor is used as the stimulating ray source 24. Particularly, the efficiency of the stimulated light emission can be raised by the use of laser light since the optical system can be simplified and the intensity of the stimulating light can be raised. Thus preferable results can be obtained.

Example of the laser include a He—Ne laser, a He—Cd laser, an Ar ion laser, a Kr ion laser, an $N_2$ laser, a YAG laser and its secondary harmonics, a ruby laser, a semiconductor laser, various kinds of dye laser and a metal vapor Laser such as a copper vapor laser. Usually, a continuously oscillating laser such as the He—Ne laser and the Ar ion laser is desirable; and a pulse oscillating laser can be used when the pulse is synchronized with the scanning time per pixel of the panel. The use of pulse oscillating laser is preferable that the use of the continuous oscillating laser by modulation when the method such as that described in JP-A 59-22046 is applied, in which the quenching light is separated form the stimulating ray utilizing the delay of the light emission, and the filter 28 is not used.

Among the foregoing various kinds of laser, the semiconductor laser is preferred since such the laser is small in the size and low in the cost; and the modulator is not necessary.

When practically suitable combination such as a combination of stimulating ray wavelength of from 500 nm to 900 nm and the stimulated light wavelength of from 300 nm to 500 nm is utilized, a purple to blue glass filter such as C-39, -40, V-40, V-42 and V-44, manufactured by Toshiba Co., Ltd., 7-54 and 7-59, manufactured by Corning Glass Co., Ltd., and BG-1, BG-3, BG-25, BG-37 and BG-38, manufactured by Spectrofilm Co., Ltd., is usable. A relatively freely selected filter may be used when an interference filter is used with together. As the photo-electric conversing device, any one capable of converting the variation of light amount to the variation of the electronic signal such as a phototube, a photomultiplier, a photodiode, a phototransistor, a photocell and a photoconductive element.

EXAMPLES

The invention is described referring examples, however the invention is not limited by the following examples.

Example 1
Preparation of Radiation Image Conversion panel 1:

Comparative Example

Preparation of Radiation Image Conversion panel 1 was prepared according to the following method.

Preparation of Substrate 1
The following light reflective layer was provided on a transparent crystallized glass plate having a thickness of 1,500 $\mu$m to prepare Substrate 1.
Preparation of Light Reflective Layer
Layers of titanium oxide and zirconium oxide, each produced by Furuuchi Kagaku Co., Ltd., were formed on the substrate surface using a vapor deposition apparatus so as to make the reflectance to 85% at 400 nm and 20% at 660 nm.
Preparation Stimulable Phosphor Plate 1
The above-prepared Substrate 1 was set in a usual vapor evaporation apparatus and heated by 240° C. Then nitrogen gas was introduced into the vacuum chamber. The vacuum degree was adjusted to 0.27 Pa, and an alkali halide phosphor of CsBr:0.001 Eu was deposited according the following procedure so as to form a phosphor layer having a columnar structure with a thickness of 300 $\mu$m. In the deposition process, the incident angle of the vapor stream was set at 0° using an aluminum slit, and the distance of the substrate to the slit or the vapor source was set at 60 cm. The deposition was preformed while parallel conveying the substrate with the direction of the substrate.

Radiation Image Conversion panel 1 was prepared using the above-prepared Stimulable phosphor Plate 1. In concrete, a glass protective layer composed of boron silicate glass having a thickness of 1,700 $\mu$m was provided through a spacer attached at the edge of the plate so that an air layer of 100 $\mu$m was formed as a low refractive layer between the stimulable phosphor layer and the glass used as the protective layer.

As the spacer, one made by glass ceramics was used, the thickness of which is control so that the thickness of the low refractive layer or the air layer is made to the prescribed value. The edge portion of the glass substrate and the glass protective layer were adhered by an epoxy type adhesive agent for preparing the Radiation Image Conversion panel 1.
Preparation of Radiation Image Conversion panel 2:

Comparative Example

Radiation Image Conversion panel 2 was prepared in the same manner as in Radiation Image Conversion panel 1 except that the material of the protective layer was changed as shown in Table 1.
Preparation of Radiation Image Conversion panels 3 through 6:

Inventive Examples

Radiation Image Conversion panels 3 through 6 were prepared in the same manner as in Radiation Image Conversion panel 1 except that the material of the substrate and the protective layer were changed as shown in Table 1.

Radiation Image Conversion panels 1 through 6 were evaluated with respect to the handling easiness or suitability to operation, the intensity of emitted light and the sharpness.
Flexibility and Handling Easiness of Panel
According to the above-mentioned method, Samples, which correspond to the construction including the substrate and the protective layer of each of Radiation Image Conversion Panels 1 to 6, were prepared, and were examined in accordance with the above-described Flexibility Test. Radiation Image Conversion Panels were considered to have the flexibility when the distance D of the respective Sample was not less than 5 mm. On the contrary, Radiation Image Conversion Panels were considered to not have the flexibility when the distance D of the respective Sample was less than 5 mm.

The handling easiness of the panel are evaluated over all by ten X-ray engineers randomly elected from a third party in a series of operation that the install of panel, the resistively against vibration during the panel being installed, the photographing by X-ray through the image leading by the stimulation by light and the treatment after the leading. The evaluation results are classified into the following 3 ranks.

A: The panel is light and easily handled, and the resistively against vibration is satisfactory.

B: The panel is heavy a little, and the resistively against vibration is satisfactory.

C: The panel is heavy, and the resistively against vibration is unsatisfactory.

Samples ranked in A and B are acceptable for practical use.

Evaluation of Sharpness

The sharpness was evaluated by a modulation transfer function, MTF.

A CTF chart was pasted on each of the radiation image conversion panel and the panel was irradiated by 10 mR of X-ray of 80 kVp; the distance to the object was 1.5 m. Then the CFT chart was lead out by scanning from the side of the phosphor layer by a beam of light of 690 nm emitted from a semiconductor laser. The power of the light beam was 40 mW at the surface of the panel. The data described in Table 1 are relative values when the MFT of Radiation Image Conversion panel 3 at 0.51 p/mm was set as 1.00.

Evaluation of Luminance (Sensitivity)

The sensitivity was determined by the following procedure with respect to each of Radiation Image Conversion panel 1 through 6.

Each of the radiation image conversion panels was irradiated by X-ray generated by a bulb voltage of 80 kVp from the back side of the substrate of the phosphor panel and stimulated by scanning by He—Ne laser light of 633 nm. The stimulated light emitted from the phosphor layer was received by a light detector, a photo multiplier having spectral sensitivity of S-5, for measuring the intensity of the light. The intensity of the light was defined as the luminance. The luminance values were described in relative value when the luminance of Radiation Image Conversion panel 3 was set as 1.00.

Thus obtained results are shown in Table 1.

TABLE 1

| Panel No. | Stimulable phosphor Composition | Substrate Material | Layer thickness ($\mu$m) | Protective layer Material | Layer thickness ($\mu$m) | Presence of Flexibility | Remarks |
|---|---|---|---|---|---|---|---|
| 1 | CsBr:Eu | Crystallized glass | 1500 | Boric silicate glass | 1700 | No | Comp. |
| 2 | CsBr:Eu | Crystallized glass | 1500 | PET with $Al_2O_3$* | 250 | No | Comp. |
| 3 | CsBr:Eu | Polyimide | 500 | Boric silicate glass | 200 | Present | Inv. |
| 4 | CsBr:Eu | Polyimide | 500 | PET with $Al_2O_3$* | 250 | Present | Inv. |
| 5 | CsBr:Eu | Boric silicate glass | 200 | Boric silicate glass | 200 | Present | Inv. |
| 6 | CsBr:Eu | Boric silicate glass | 200 | PET with $Al_2O_3$* | 250 | Present | Inv. |

| Panel No. | Handling easiness | Luminance | Sharpness | Remarks |
|---|---|---|---|---|
| 1 | C | 0.96 | 0.99 | Comparative |
| 2 | C | 0.95 | 0.98 | Comparative |
| 3 | B | 1.00 | 1.00 | Inventive |
| 4 | A | 0.99 | 0.98 | Inventive |
| 5 | B | 0.98 | 0.99 | Inventive |
| 6 | A | 0.97 | 0.98 | Inventive |

PET with $Al_2O_3$*: VMPET: aluminum deposited PET commercial product): produced by Toyo Metalizing Co., Ltd.
Comp.; Comparative,
Inv.; Inventive It is clear that the samples according to the invention, in which the substrate and the protective layer each has the flexibility, are superior to the comparative samples in the handling easiness and show high image quality.

EFFECTS OF THE INVENTION

The radiation image conversion panel and the producing method thereof, which has high strength, excellent handling easiness and high image quality, can be provided by the invention.

What is claimed is:

1. A radiation image conversion panel comprising a substrate having thereon a stimulable phosphor layer and a protective layer,
    wherein the stimulable phosphor layer is formed on the substrate by a vapor-phase deposition method so that the stimulable phosphor layer has a columnar crystal structure, and a construction including the substrate and the protective layer has a flexibility.

2. The radiation image conversion panel of claim 1, wherein each of the substrate and the protective layer has an organic material plate or a glass plate having a thickness of not more than 1000 µm.

3. The radiation image conversion panel of claim 1, wherein the stimulable phosphor layer comprises a stimulable phosphor having a composition represented by following General Formula (1), $$M^I X \cdot aM^{II} X'_2 \cdot bM^{III} X''_3 \cdot eA \qquad \text{General Formula (1)}$$

wherein $M^I$ is an alkaline metal selected from the group consisting of Li, Na, K, Rb and Cs; $M^{II}$ is a divalent metal select from the group consisting of Be, Mg, Ca, Sr, Ba, Zn Cd and Ni; $M^{III}$ is a trivalent metal selected from the group consisting of Sc, Y, La, Ce, Pr, Nd, Pm, Sm Eu, Gd, Th, Dy, Ho, Er, m Yb, Lu, Al, Ga and In; each of X, X' and X" is a halogen selected from the group consisting of F, Cl, Br and I; A is a metal selected from the group consisting of Eu, Tb, In, Ga, Ce, m, Dy, Pr, Ho, Nd, Yb, Er, Gd, Lu, Sm, Y, Tl, Na, Ag, Cu and Mg; and each of a, b, and e is a numeral within a range of $0 \leq a \leq 05$, $0 \leq b < 0.5$, and $0 < e \leq 0.2$, respectively.

4. The radiation image conversion panel of claim 3, wherein, in General Formula (1), $M^I$ is an alkaline metal selected from the group consisting of K, Rb and Cs.

5. The radiation image conversion panel of claim 3, wherein, in General Formula (1), X is Br or I.

6. The radiation image conversion panel of claim 3, wherein, in General Formula (1), $M^{II}$ is a divalent metal selected from the group consisting of Be, Mg, Ca, Sr and Ba.

7. The radiation image conversion panel of claim 3, wherein, in General Formula (1), $M^{III}$ is a trivalent metal select from the group consisting of Y, La, Ce, Sm, Eu, Gd, Lu, Al, Ga and In.

8. The radiation image conversion panel of claim 3, wherein, in General Formula (1), b is a numeral within a range of $0 \leq b \leq 10^{-2}$.

9. The radiation image conversion panel of claim 3, wherein, in General Formula (1), A is a metal selected from the group consisting of Eu, Ce, Sm, Tl and Na.

10. The radiation image conversion panel of claim 3, wherein the stimulable phosphor having the composition represented by General Formula (1) is represented by following General Formula (2), $$CsX:yA \qquad \text{General Formula (2)}$$

wherein X represents Cl, Br, or I; A represents Eu, Sm, In, Tl, Ga or Ce; and y is a numeral within a range of from $1 \times 10^{-7}$ to $1 \times 10^{-2}$.

11. The radiation image conversion panel of claim 1, wherein the substrate has a thickness of 10 µm to 1,000 µm.

12. The radiation image conversion panel of claim 1, wherein the substrate has a thickness of 50 µm to 500 µm.

13. The radiation image conversion panel of claim 1, wherein the flexibility of the construction including the substrate and the protective layer means that when a square sample of the construction having an area of 40 cm² is supported at both points positioned at 3 cm from both ends by supporting members and the central point of the construction is pressed, the central point shifts 5 mm or more from the original position.

14. The radiation image conversion panel of claim 13, wherein the central point shifts 10 mm or more from the original position.

15. The radiation image conversion panel of claim 13, wherein the central point shifts 20 mm or more from the original position.

16. A method for producing a radiation image conversion panel, comprising the steps of:

forming a stimulable phosphor layer on a substrate by a vapor-phase deposition method so that the stimulable phosphor layer has a columnar crystal structure, and sealing the stimulable phosphor layer by superposing a protective layer on the stimulable phosphor layer, wherein a construction including the substrate and the protective layer has a flexibility.

17. The method of claim 16, wherein, during the forming step, a stimulable phosphor or a raw material of the stimulable phosphor is poured on the substrate in an incident angle of 0 degree to 80 degrees with a normal line of a surface of the substrate.

18. The method of claim 17, wherein the stimulable phosphor or the raw material of the stimulable phosphor is poured in the incident angle of 0 degree to 70 degrees.

19. The method of claim 17, wherein the stimulable phosphor or the raw material of the stimulable phosphor is poured in the incident angle of 20 degrees to 80 degrees, and thereby, the stimulable phosphor layer constituted by independent columnar crystals is formed on the substrate in a growing angle of 10 degrees to 70 degrees with the normal line of the surface of the substrate.

20. The method of claim 19, wherein the stimulable phosphor or the raw material of the stimulable phosphor is poured in the incident angle of 40 degrees to 70 degrees, and thereby, the stimulable phosphor layer is formed on the substrate in a growing angle of 10 degrees to 70 degrees.

21. The method of claim 16, wherein the substrate has a thickness of 10 µm to 1,000 µm.

22. The method of claim 16, wherein the substrate has a thickness of 50 µm to 500 µm.

* * * * *